(12) United States Patent  (10) Patent No.: US 12,225,317 B2
Sayer et al.  (45) Date of Patent: Feb. 11, 2025

(54) FRONT-END CLIPPING USING VISUAL CUES (71) Applicant: INTERNATIONAL BUSINESS MACHINES CORPORATION, Armonk, NY (US)

(72) Inventors: Joseph Sayer, Bury St Edmunds (GB); Andrew David Lyell, Winchester (GB); Benjamin David Cox, Newbury (GB)

(73) Assignee: International Business Machines Corporation, Armonk, NY (US)

(*) Notice: Subject to any disclaimer, the term of this patent is extended or adjusted under 35 U.S.C. 154(b) by 156 days.

(21) Appl. No.: 17/653,287

(22) Filed: Mar. 3, 2022

(65) Prior Publication Data
US 2023/0283740 A1 Sep. 7, 2023

(51) Int. Cl.
H04N 5/067 (2006.01)
G10L 25/57 (2013.01)
H04N 7/04 (2006.01)

(52) U.S. Cl.
CPC ............. *H04N 5/067* (2013.01); *G10L 25/57* (2013.01); *H04N 7/04* (2013.01)

(58) Field of Classification Search
CPC ........... H04N 5/067; H04N 7/04; G10L 25/57
See application file for complete search history.

(56) References Cited

U.S. PATENT DOCUMENTS

| 6,894,714 B2 | 5/2005 | Gutta |
| 2007/0120966 A1 | 5/2007 | Murai |
| 2014/0003450 A1 | 1/2014 | Bentley |
| 2018/0376108 A1* | 12/2018 | Bright-Thomas ...... G06V 20/40 |
| 2020/0077049 A1 | 3/2020 | Bright-Thomas |
| 2020/0329084 A1 | 10/2020 | Kegel |
| 2021/0076002 A1 | 3/2021 | Peters |
| 2022/0201057 A1* | 6/2022 | Delsordo ................. H04N 5/04 |

(Continued)

FOREIGN PATENT DOCUMENTS

| CN | 1422494 A | 6/2003 |
| CN | 107430858 B | 11/2020 |
| CN | 113808610 A | 12/2021 |

(Continued)

OTHER PUBLICATIONS

Mell et al., "The NIST Definition of Cloud Computing", National Institute of Standards and Technology, Special Publication 800-145, Sep. 2011, 7 pages.

(Continued)

*Primary Examiner* — Olisa Anwah
(74) *Attorney, Agent, or Firm* — Michael O'Keefe (57) ABSTRACT According to one embodiment, a method, computer system, and computer program product for front-end clipping reduction is provided. The embodiment may include capturing input, including at least one visual input and at least one audio input. The embodiment may also include modeling data regarding visual cues based on a visual input from the at least one visual input. The embodiment may further include marking one or more timestamps which, in light of the modeled data, correspond to speech in the at least one audio input. The embodiment may also include transmitting an audio input from within the at least one audio input corresponding to the one or more marked timestamps.

20 Claims, 5 Drawing Sheets (56) References Cited

U.S. PATENT DOCUMENTS

2022/0319537 A1\* 10/2022 Michaelis ............... G10L 15/22
2023/0260520 A1\* 8/2023 Medalion ............... G10L 17/18
704/232

FOREIGN PATENT DOCUMENTS

| CN | 111937376 B | 8/2022 |
| CN | 113301291 B | 12/2022 |
| TW | 201939483 A | 10/2019 |

OTHER PUBLICATIONS

"Patent Cooperation Treaty PCT International Search Report", International Application No. PCT/IB2023/051904, International Filing Date: Mar. 1, 2023, Date of Mailing: Jul. 12, 2023, 9 pages.

\* cited by examiner

FIG. 5

FRONT-END CLIPPING USING VISUAL CUES

BACKGROUND

The present invention relates generally to the field of computing, and more particularly to video conferencing.

Video conferencing is a means of live telecommunication that allows users to communicate by video, audio, and often text chat. The addition of video enables users to engage in nonverbal communication, but also to share their screens, which can assist in business presentation, technical support, video game streaming, and a variety of other applications. Video conferencing can be efficient and practical, but can also help individuals build and maintain relationships from a great distance. As such, it is important to maximize the quality of the participant's experience in video conferencing, so that users can feel more as though they are face to face.

SUMMARY

According to one embodiment, a method, computer system, and computer program product for front-end clipping reduction is provided. The embodiment may include capturing input, including at least one visual input and at least one audio input. The embodiment may also include modeling data regarding visual cues based on a visual input from the at least one visual input. The embodiment may further include marking one or more timestamps which, in light of the modeled data, correspond to speech in the at least one audio input. The embodiment may also include transmitting an audio input from within the at least one audio input corresponding to the one or more marked timestamps.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to video conferencing. The following described exemplary embodiments provide a system, method, and program product to, among other things, reduce front-end clipping. Therefore, the present embodiment has the capacity to improve the technical field of video conferencing by improving voice activity detection, and more particularly by reducing front-end clipping.

As previously described, video conferencing is a means of live telecommunication that allows users to communicate by video, audio, and often text chat. The addition of video enables users to engage in nonverbal communication, but also to share their screens, which can assist in business presentation, technical support, video game streaming, and a variety of other applications. Video conferencing can be efficient and practical, but can also help individuals build and maintain relationships from a great distance.

However, video conferencing solutions in the real world need to contend with issues such as limited bandwidth and poor network connections. In accounting for these problems, many video conferencing systems engage in voice activity detection, only recording or transmitting audio when a particular participant's microphone picks up speech patterns, as opposed to apparent background noise. One consequence of voice activity detection, known as front-end clipping, commonly occurs when video conferencing solutions fail to record or transmit audio until after a participant begins speaking. This may result in an opening portion of a given speech segment being cut off from the recorded or transmitted audio. As such, it may be important to maximize the quality of the participant's experience in video conferencing by minimizing front-end clipping.

According to at least one embodiment, a video conferencing solution may use video input to help record and transmit audio input with a reduction in front-end clipping or other performance issues. Unlike other systems for video conferencing, this system may use video input to model and track visual cues that may signify that a participant is likely to speak soon. The system may model visual cues from video input alongside audio cues such as breathing patterns, or other cues such as keyboard activity. The system may further combine these inputs into a machine learning (ML) model that is better able to predict whether or not a participant is likely to speak soon, thereby allowing the system to predict which audio should be transmitted and when.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for reducing front-end clipping by modeling visual cues that may signify incoming speech.

Figure 1:
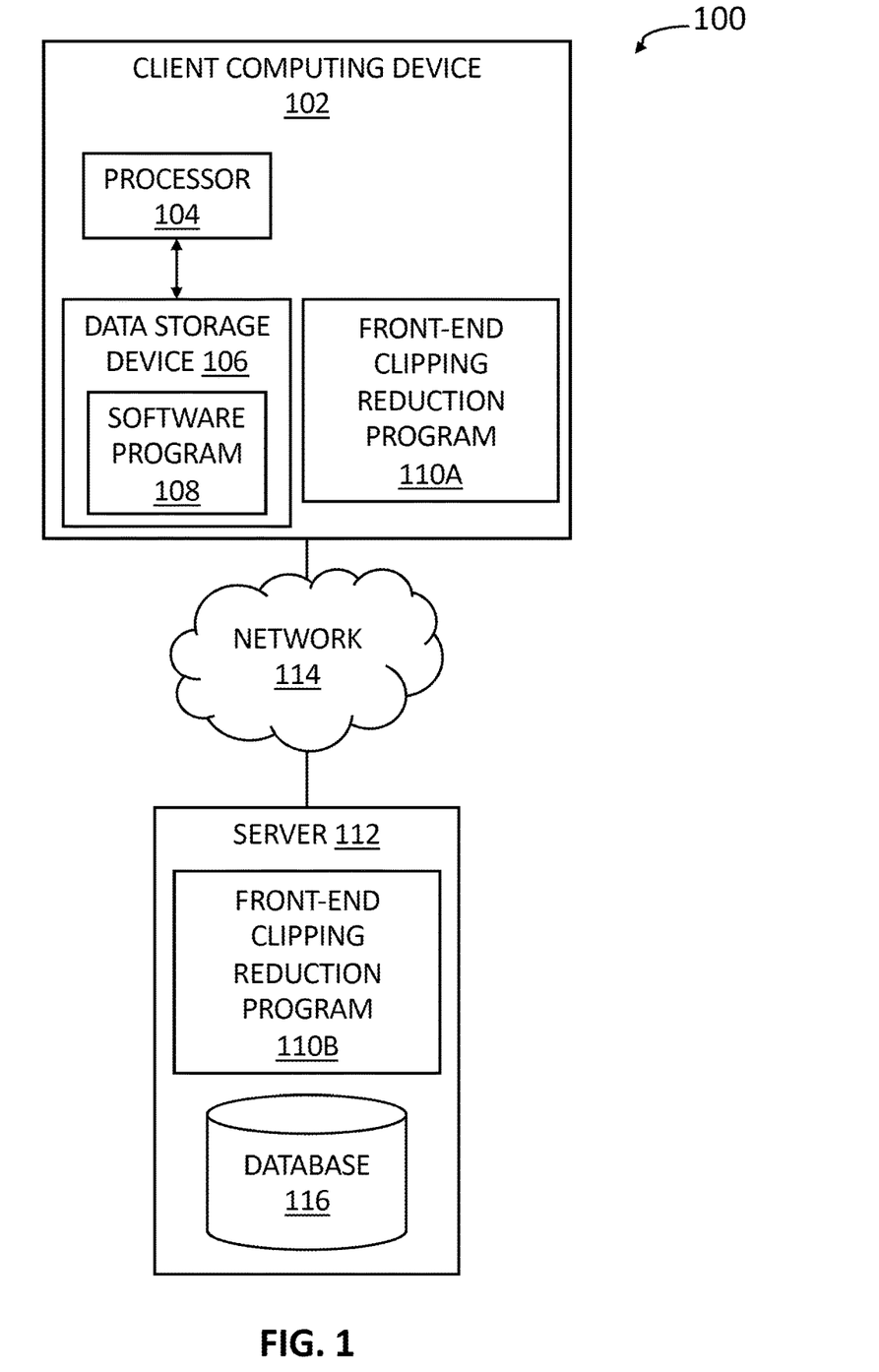
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102, and a server 112, interconnected via a communication network 114. According to at least one implementation, the networked computer environment 100 may include a plurality of client computing devices 102 and servers 112 of which only one of each is shown for illustrative brevity. Additionally, in one or more embodiments, the client computing device 102 and server 112 may each individually host a front-end clipping reduction program 110A, 110B. In one or more other embodiments, the front-end clipping reduction program 110A, 110B may be partially hosted on both client computing device 102 and server 112 so that functionality may be separated between the devices.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a front-end clipping reduction program 110A and communicate with the server 112 via the communication network 114, in accordance with one embodiment of the invention. There may be a visual sensor or an audio sensor embedded in or communicatively coupled with client computing device 102. In one or more other embodiments, client computing device 102 may be, for example, a mobile device, a telephone, a personal digital assistant, a vehicle, a netbook, a laptop computer, a tablet computer, a desktop computer, a smart speaker, a television, or any type of computing device capable of running a program and accessing a network. As previously described, one client computing device 102 is depicted in FIG. 1 for illustrative purposes, however, any number of client computing devices 102 may be utilized. As will be discussed with reference to FIG. 3, the client computing device 102 may include internal components 302a and external components 304a, respectively.

The server computer 112 may be a laptop computer, netbook computer, personal computer (PC), a desktop computer, a smart home hub, a web server, or any programmable electronic device or any network of programmable electronic devices capable of hosting and running a front-end clipping reduction program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the front-end clipping reduction program 110A, 110B may be capable of reducing front-end clipping in the audio transmission context. In at least one embodiment, the front-end clipping reduction program 110A, 110B may use the video input to model visual cues to predict an incoming speech pattern. The front-end clipping reduction program 110A, 110B may then record audio, marking audio that is believed to contain speech. The front-end clipping reduction program 110A, 110B may record audio earlier or in higher quality when it predicts incoming speech. The front-end clipping reduction program 110A, 110B may further transmit marked audio. In at least one embodiment, the front-end clipping reduction program 110A, 110B may transmit video alongside or synchronized with the marked audio. The method for front-end clipping reduction is explained in further detail below with respect to FIG. 2.

Figure 2:
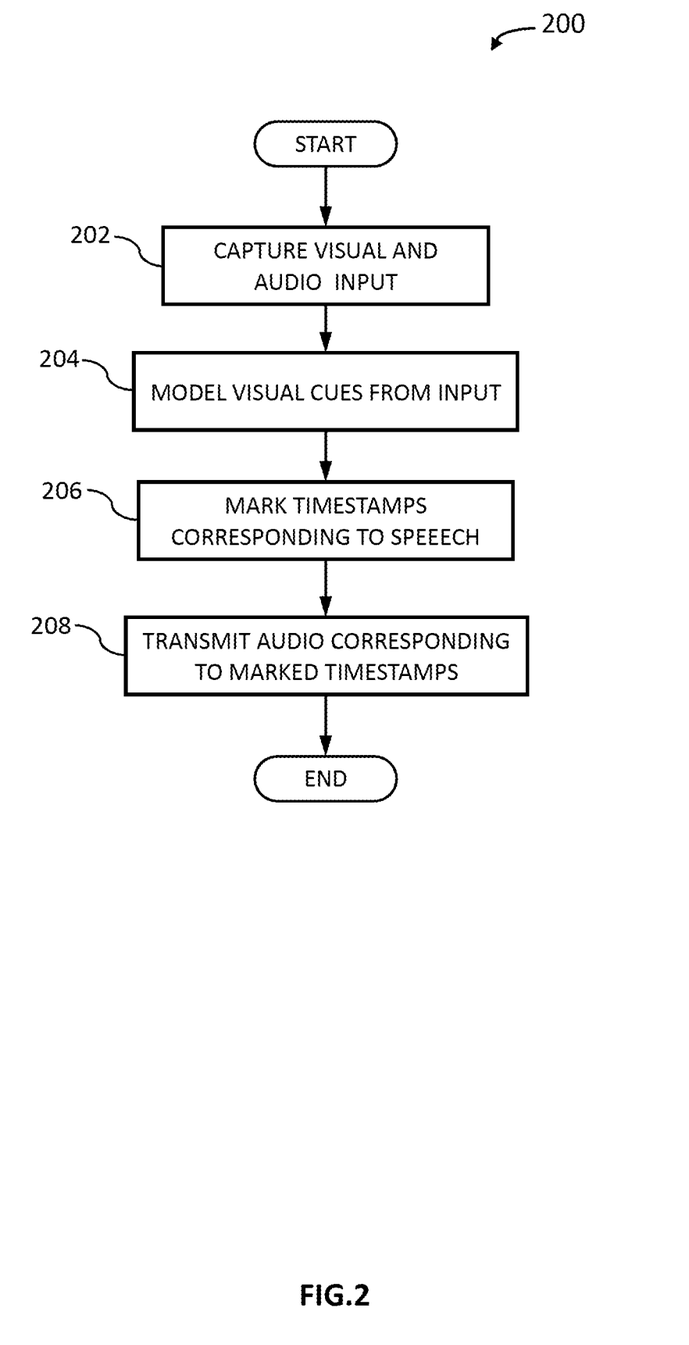
FIG. 2 illustrates an operational flowchart for a process for front-end clipping reduction according to at least one embodiment.

Referring now to FIG. 2, an operational flowchart illustrating a process for front-end clipping reduction 200 is depicted according to at least one embodiment. At 202, the front-end clipping reduction program 110A, 110B captures visual and audio input of at least one user. Visual input may be captured using one or more cameras or other visual sensors embedded in or communicatively coupled with client computing device 102. Visual sensors may include a smartphone's front-facing camera, a smartphone's rear-facing camera module, an integrated laptop webcam, a peripheral webcam, an infrared sensor, or a visual motion sensor. Visual input may be captured as two-dimensional input or three-dimensional input.

Capturing audio input may include recording audio using one or more audio sensors embedded in or communicatively coupled with computing device 102. An audio sensor may include, for example, a smartphone's microphone array, a microphone on a pair of headphones, or a dedicated peripheral microphone.

The front-end clipping reduction program 110A, 110B may combine visual input from multiple cameras or sensors into one visual input stream. Alternatively, the front-end clipping reduction program 110A, 110B may maintain the separate visual input streams. Separate visual input streams may carry synchronized time signatures. Multiple input streams may be combined into new formats. For example, multiple two-dimensional input streams may be combined into a three-dimensional format. Alternatively, a two-dimensional input stream and a three-dimensional input stream may be combined into a two- or three-dimensional format.

Likewise, the front-end clipping reduction program 110A, 110B may combine audio input from multiple sources into one combined input stream or maintain separate audio input streams. The front-end clipping reduction program 110A, 110B may further synchronize the time signatures of visual input and audio input.

In at least one embodiment, the front-end clipping reduction program 110A, 110B may capture supplemental data that may assist in modeling visual cues at 204. Supplemental data may include data from non-visual motion sensors or tactile input. Non-visual motion sensors may include gyroscopic sensors present in smartphones or video game controllers. Tactile input may include touch screen input, keyboard input, trackpad input, or input from an electronic scale.

In a further embodiment, the front-end clipping reduction program 110A, 110B may capture additional data that may be transmitted alongside audio data at 208. For example, the front-end clipping reduction program 110A, 110B may capture metadata, text-based input, touch-based input, or a video recording of a display such as computer display monitor 344.

In at least one embodiment, the front-end clipping reduction program 110A, 110B may only capture input through input streams that the user chooses to enable through an opt-in procedure. The front-end clipping reduction program 110A, 110B may offer users an option to disable any input stream, including the visual or audio stream, temporarily or indefinitely, reenable an input stream, or switch one input stream for another. For example, a user may mute a microphone, or switch from using a microphone embedded in a laptop to a peripheral microphone.

Then, at 204, the front-end clipping reduction program 110A, 110B models visual cues from the visual input that indicate that a user may speak soon. A visual cue may include a user's mouth opening, a shift in a user's posture, a user's chair moving, or any other visual pattern that may indicate speech. The front-end clipping reduction program 110A, 110B may recognize visual cues using known image and video recognition techniques, which may include use of software program 108, use of an artificial intelligence program, or the use of the model created by modeling past visual cues.

In at least one embodiment, modeling visual cues may be performed by noting that a visual cue currently indicates that speech is incoming. Alternatively, modeling visual cues may be performed by use of artificial intelligence (AI). Modeling may include predicting or gauging the likelihood that a user will speak shortly, predicting when a user is likely to speak, or predicting the most likely volume at which the user will speak. Modeling may also include a process of gathering data regarding the past accuracy rate of such predictions. Furthermore, modeling may include a process of ML in light of such gathered data.

In at least one embodiment, the front-end clipping reduction program 110A, 110B may also take into account audio recorded at 202. For example, the front-end clipping reduction program 110A, 110B may use recorded audio to inform the ML modeling process described above.

In yet another embodiment, modeling may take into account supplemental data captured at 202. For example, the front-end clipping reduction program 110A, 110B may note that, when User A reaches forward, User A either intends to speak or type on User A's laptop computer, but not both. The front-end clipping reduction program 110A, 110B may further note that User A is currently typing.

In a further embodiment, the front-end clipping reduction program 110A, 110B may model other visual cues, including cues that a user will stop speaking soon, cues that a user has finished speaking, or cues that a user's speaking volume may change.

Then, at 206, the front-end clipping reduction program 110A, 110B marks timestamps corresponding to audio that is suspected of corresponding to speech in light of the modeled data. Marking timestamps may include marking the present moment in an audio stream as suspected of corresponding to speech. Alternatively, marking timestamps may include marking a timestamp in the future, for example a timestamp one second in the future, as suspected of corresponding to speech. Alternatively, marking timestamps may include marking a timestamp in the past, for example 3 milliseconds in the past, as suspected of corresponding to speech.

In at least one embodiment, a timestamp may be an absolute timestamp, such as an epoch-based timestamp, a date and time, or a number of milliseconds since a call began. Alternatively, a timestamp may be a relative timestamp, such as "28 milliseconds after this frame of video was captured," or "18 milliseconds from now," where "now" may, for example, signify the moment that instruction is given.

In at least one embodiment, marking may be a binary measure of whether or not a given timestamp is suspected to correspond to speech. Alternatively, marking may be a discrete measure of levels of certainty with which a timestamp is suspected of corresponding to speech. For example, levels may include level 0 for audio that is known not to correspond to speech, level 1 for audio that may correspond to speech, level 2 for timestamps that likely correspond to speech, and level 3 for timestamps that are known to correspond to speech. Alternatively, marking may be a continuous measure of the probability that a particular timestamp contains speech. For example, a timestamp one second after a user's mouth is recognized as opening may have a 57% probability of corresponding to speech, and a timestamp for audio that has already been recorded may be marked with a 0.3% probability or a 99.6% probability of corresponding to speech.

In a further embodiment, a given timestamp may be marked more than once. For example, unix timestamp (in milliseconds) 1681220433477 may be marked at timestamp 1681220432324 as 67% likely to correspond to speech, and then marked again at timestamp 1681220434817 as 98.9% likely to correspond to speech.

In at least one embodiment, the front-end clipping reduction program 110A, 110B may mark a start time and end time as suspected of starting and concluding speech. Alternatively, all time stamps in a range between a suspected start of speech and suspected end of speech may be marked as suspected of corresponding to speech. Alternatively, each time stamp may be marked independently based on data available for that particular timestamp.

In yet another embodiment, the front-end clipping reduction program 110A, 110B may mark additional time before or after speech as a hedge to reduce the likelihood that speech is excluded by mistake.

In an alternate embodiment, the front-end clipping reduction program 110A, 110B may additionally mark timestamps associated with other interesting audio, such as music, applause, or video game sound effects, for transmission at step 208. For example, the front-end clipping reduction program 110A, 110B may mark timestamps suspected to contain guitar music for transmission at step 208. Alternatively, the front-end clipping reduction program 110A, 110B may mark timestamps for exclusion from transmission, such as timestamps corresponding to loud audio feedback, or timestamps corresponding to audio that is heavily dominated by background noise that is determined to be undesirable, such as an alarm sound, a dog barking, or a baby crying.

Then, at 208, the front-end clipping reduction program 110A, 110B transmits audio corresponding to marked timestamps. Transmission of audio may be performed using known methods, including transmission over a cellular network voice protocol, internet protocol, local wireless network protocol, or Bluetooth® (Bluetooth and all Bluetooth-based trademarks and logos are trademarks or registered trademarks of the Bluetooth Special Interest Group and/or its affiliates).

In at least one other embodiment, the front-end clipping reduction program 110A, 110B may transmit visual data alongside the transmitted audio. Visual data may be transmitted continuously, regardless of whether the corresponding time stamp is marked. Alternatively, the front-end clipping reduction program 110A, 110B may transmit a video recording of a display such as computer display monitor 344. The front-end clipping reduction program 110A, 110B may further synchronize the transmitted visual data or video recording with audio data.

In a further embodiment, the front-end clipping reduction program 110A, 110B may transmit additional data collected at 202, such as metadata, text-based input, or touch-based input. For example, if a user uses a touch screen to input a drawing, the front-end clipping reduction program 110A, 110B may transmit the drawing.

In yet another embodiment, the front-end clipping reduction program 110A, 110B may transmit audio through a server, such as server 112. Alternatively, the front-end clipping reduction program 110A, 110B may transmit audio directly to a peer client computing device 102. The front-end clipping reduction program 110A, 110B may transmit audio each way between two or more client computing devices 102 in, for example, a video chat context. Alternatively, the front-end clipping reduction program 110A, 110B may transmit audio from a small number of devices to a larger number of receiving devices, in, for example, a video streaming context.

In at least one embodiment, the front-end clipping reduction program 110A, 110B may transmit audio based on additional factors taken in combination with the marking of a given timestamp. For example, if there is a low amount of bandwidth available, and one client computing device 102 is transmitting both audio and video, the front-end clipping reduction program 110A, 110B may only transmit audio corresponding to that client computing device 102 marked with a greater than 91% probability of corresponding to speech. Alternatively, if a microphone is identified as picking up a large amount of background noise, the front-end clipping reduction program 110A, 110B may only transmit audio marked with a greater than 93% probability of corresponding to speech. Alternatively, if there is a high amount of bandwidth available and low background noise, the front-end clipping reduction program 110A, 110B may transmit audio marked with a greater than 59% probability of corresponding to speech.

In yet another embodiment, the front-end clipping reduction program 110A, 110B may transmit audio on a slight delay. This may allow time for the front-end clipping reduction program 110A, 110B to more thoroughly calculate and more accurately mark timestamps. Visual data may be transmitted on a delay synchronized with the audio.

In a further embodiment, the front-end clipping reduction program 110A, 110B may transmit audio beginning at a time shortly before or ending shortly after the marked timestamps. This short time buffer may be a predetermined amount of time, or an algorithmically determined amount of time. For example, if there is high background noise, the time buffer may be 30 milliseconds, whereas if there is low background noise, the time buffer may be 1100 milliseconds.

In at least one embodiment, the front-end clipping reduction program 110A, 110B may provide users an option regarding which input stream is transmitted. For example, if the front-end clipping reduction program 110A, 110B captures both visual input of a user's face and a video recording of a device display, a user may select only the video recording of the device display for transmission.

It may be appreciated that FIG. 2 provides only an illustration of one implementation and does not imply any limitations with regard to how different embodiments may be implemented. Many modifications to the depicted environments may be made based on design and implementation requirements.

Figure 3:
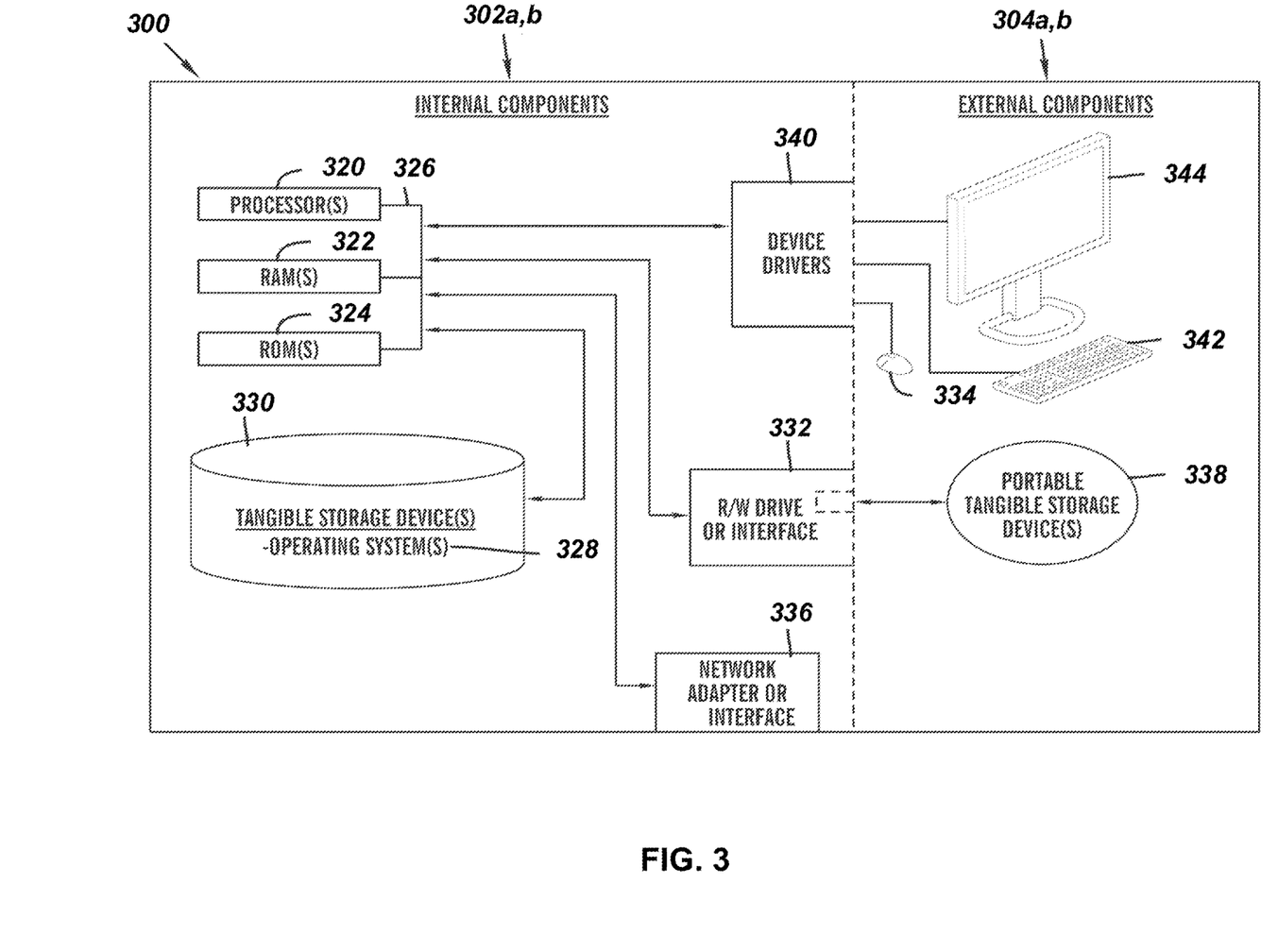
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 a,b and external components 304 a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the front-end clipping reduction program 110A in the client computing device 102 and the front-end clipping reduction program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the front-end clipping reduction program 110A, 110B, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The software program 108 and the front-end clipping reduction program 110A in the client computing device 102 and the front-end clipping reduction program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the front-end clipping reduction program 110A in the client computing device 102 and the front-end clipping reduction program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices.

Each of the sets of internal components 302 *a,b* also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
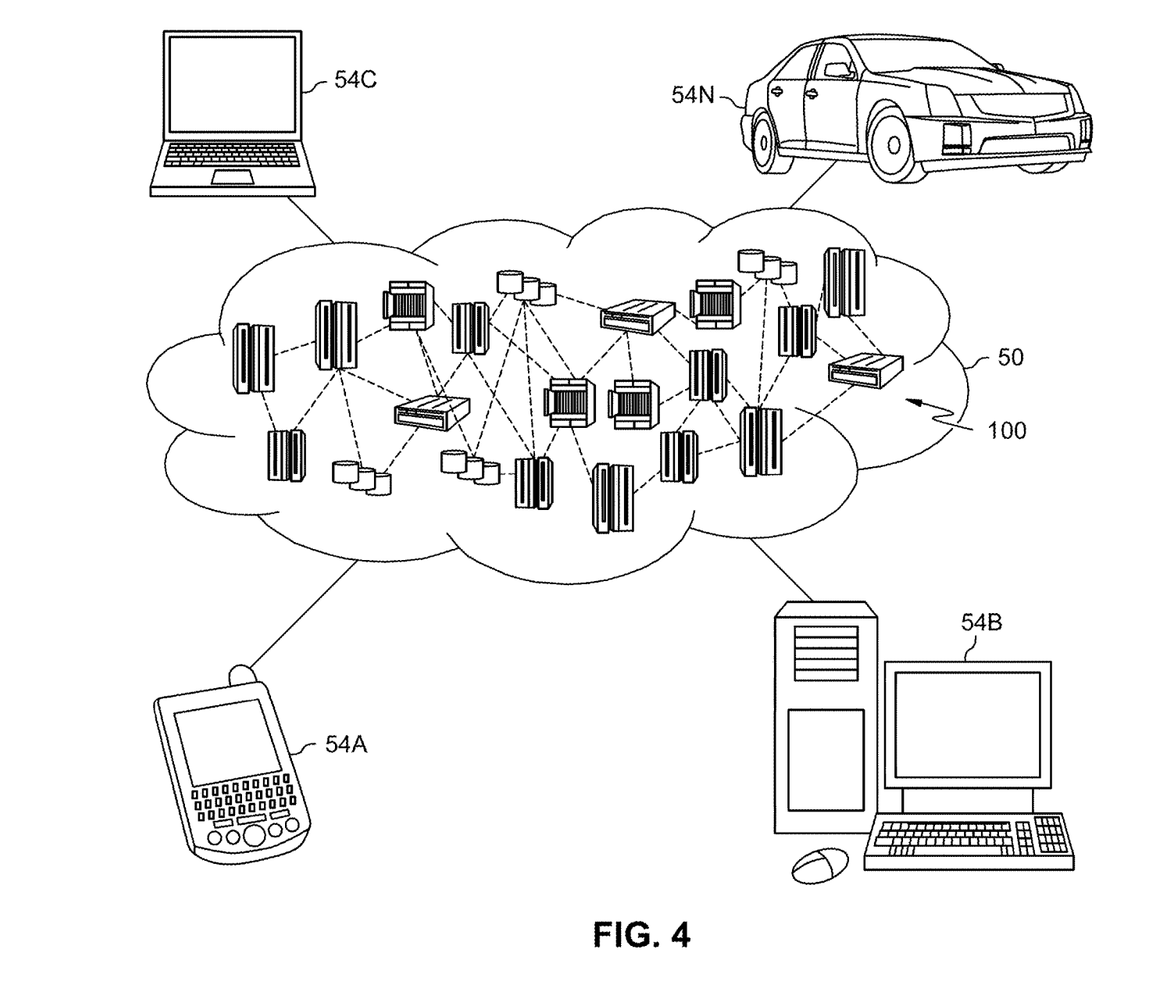
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
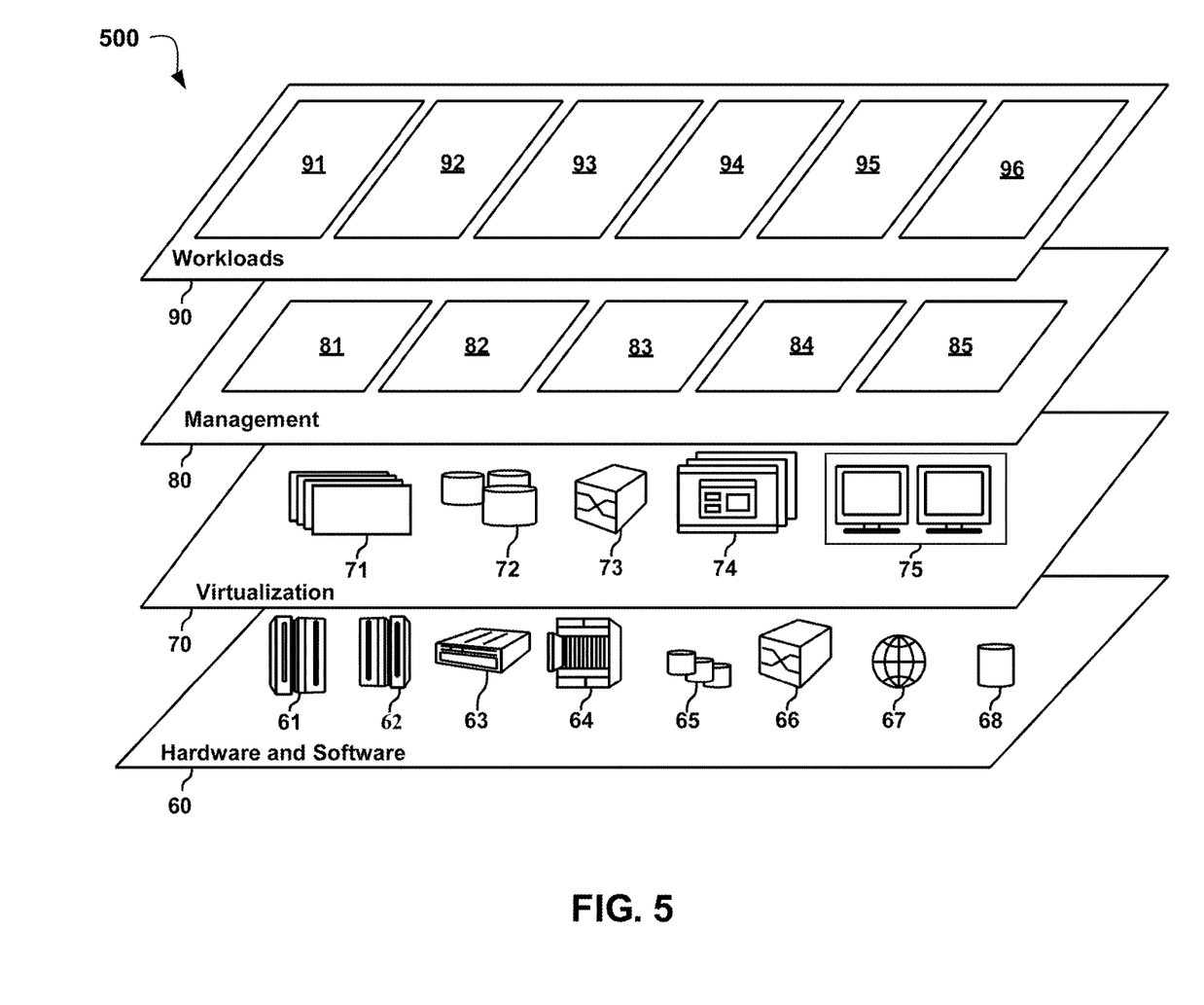
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and front-end clipping reduction 96. Front-end clipping reduction 96 may relate to reducing front-end clipping by modeling visual cues to recognize incoming speech.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:
    capturing input, including at least one visual input and at least one audio input, to a first device;
    training a machine learning model to recognize a visual cue indicative of a user desire to speak and predict a volume at which a user will speak based on a visual input from the at least one visual input and an audio input, synchronized to the visual input, from the at least one audio input;
    marking one or more timestamps which are determined, using the model, to correspond to speech in the at least one audio input; and
    transmitting an audio input from within the at least one audio input corresponding to the one or more marked timestamps from the first device to a second device.

2. The method of claim 1, further comprising:
    transmitting a visual input.

3. The method of claim 2, wherein transmitting the visual input further comprises:
    synchronizing a visual input in time with a corresponding audio input.

4. The method of claim 1, wherein marking a timestamp from within the one or more timestamps further comprises:
    measuring a likelihood that a timestamp within the one or more timestamps corresponds to speech in an audio input from within the at least one audio input.

5. The method of claim 1, wherein the one or more marked timestamps correspond to a present moment at which the marking occurs.

6. The method of claim 1, wherein the one or more marked timestamps correspond to future moments in time from a point at which the marking occurs.

7. The method of claim 1, wherein one timestamp from within the marked timestamps is marked more than once.

8. A computer system, the computer system comprising:
    capturing input, including at least one visual input and at least one audio input, to a first device;
    training a machine learning model to recognize a visual cue indicative of a user desire to speak and predict a volume at which a user will speak based on a visual input from the at least one visual input and an audio input, synchronized to the visual input, from the at least one audio input;
    marking one or more timestamps which are determined, using the model, to correspond to speech in the at least one audio input; and
    transmitting an audio input from within the at least one audio input corresponding to the one or more marked timestamps from the first device to a second device.

9. The computer system of claim 8, further comprising:
    transmitting a visual input.

10. The computer system of claim 9, wherein transmitting the visual input further comprises:
    synchronizing a visual input in time with a corresponding audio input.

11. The computer system of claim 8, wherein marking a timestamp from within the one or more timestamps further comprises:
    measuring a likelihood that a timestamp within the one or more timestamps corresponds to speech in an audio input from within the at least one audio input.

12. The computer system of claim 8, wherein the one or more marked timestamps correspond to a present moment at which the marking occurs.

13. The computer system of claim 8, wherein the one or more marked timestamps correspond to future moments in time from a point at which the marking occurs.

14. The computer system of claim 8, wherein one timestamp from within the marked timestamps is marked more than once.

15. A computer program product, the computer program product comprising:
    capturing input, including at least one visual input and at least one audio input, to a first device;
    training a machine learning model to recognize a visual cue indicative of a user desire to speak and predict a volume at which a user will speak based on a visual input from the at least one visual input and an audio input, synchronized to the visual input, from the at least one audio input;

marking one or more timestamps which are determined, using the model, to correspond to speech in the at least one audio input; and transmitting an audio input from within the at least one audio input corresponding to the one or more marked timestamps from the first device to a second device.

16. The computer program product of claim 15, further comprising:

transmitting a visual input.

17. The computer program product of claim 16, wherein transmitting the visual input further comprises:

synchronizing a visual input in time with a corresponding audio input.

18. The computer program product of claim 15, wherein marking a timestamp from within the one or more timestamps further comprises:

measuring a likelihood that a timestamp within the one or more timestamps corresponds to speech in an audio input from within the at least one audio input.

19. The computer program product of claim 15, wherein the one or more marked timestamps correspond to a present moment at which the marking occurs.

20. The computer program product of claim 15, wherein the one or more marked timestamps correspond to future moments in time from a point at which the marking occurs.

* * * * *